United States Patent [19]

Cross

[11] Patent Number: 4,540,156

[45] Date of Patent: Sep. 10, 1985

[54] FLUID FLOW CONTROL VALVE

[75] Inventor: David E. Cross, Whitburn, England

[73] Assignee: Bard Limited, Sunderland, England

[21] Appl. No.: 545,362

[22] Filed: Oct. 25, 1983

[30] Foreign Application Priority Data

Nov. 9, 1982 [GB] United Kingdom ................. 8231971

[51] Int. Cl.³ ............................................... F16K 5/00
[52] U.S. Cl. .................................... 251/309; 604/323;
604/335; 604/350
[58] Field of Search ............... 251/213, 286, 309, 312,
251/366, 367; 604/323, 335, 350

[56] References Cited

U.S. PATENT DOCUMENTS

| 3,185,179 | 5/1965 | Harautuneian | 251/309 |
| 3,268,203 | 8/1966 | Gilmont et al. | 251/309 |
| 3,481,367 | 12/1969 | Deuschle | 251/309 |
| 4,460,362 | 7/1984 | Bates | 604/323 |

FOREIGN PATENT DOCUMENTS 642523 9/1950 United Kingdom .

*Primary Examiner*—Martin P. Schwadron
*Assistant Examiner*—Sheri Novack
*Attorney, Agent, or Firm*—Dennison, Meserole, Pollack & Scheiner

[57] ABSTRACT

A valve for a body fluid storage container comprises a valve body (11) and a manually operable valve member (10) rotatable in a through aperture (14) therein, between an open disposition in which a touch surface (30,31) of the valve member stands away from the fluid flow path (15) through the valve and a closed disposition in which it lies close to it. The valve member has a unitary construction in which a first limb (33) extends from an insert portion (37) of the valve member, at one end of the through aperture, to the touch surface, and a second limb extends from the touch surface to a retaining portion (40) which engages, at the other end of the through aperture, with a leading end (42) of the insert portion to hold the valve member in position in the valve body. This two-part valve provides a cheap disposable item for use with disposable containers.

10 Claims, 5 Drawing Figures

FLUID FLOW CONTROL VALVE

BACKGROUND OF THE INVENTION

1. Field of the Invention

This invention relates to fluid flow control valves and, more particularly, but not exclusively, is concerned with such valves suitable for use as drainage valves for body fluid storage containers.

2. Description of the Prior Art

Persons who suffer from incontinence can benefit from the provision of a urine drainage bag suspended against one of their legs. The bag has beneath its lower edge a manually operable, fluid flow control valve, normally set to a closed disposition but operable by the wearer for movement to an open disposition to empty the bag of urine.

It is convenient to treat the assembly of bag and valve as a "disposable" item, that is, an item having a relatively short service life compared with the lives of other items with which it cooperates in use, the bag being disconnected from these items at the end of its useful life and replaced by a fresh bag, perhaps taken from a multiple pack of such bags. There is accordingly a need for the construction of the bag and valve assembly to be as cheap and easy to manufacture as is consistent with its use.

As users will often wish to wear the drainage bag under trousers, there is a need for the valve in its closed disposition to be free from projections and sharp surfaces. Further, it is desirable that a user should be well aware of the fact, whenever the valve is accidentally allowed to remain in the open disposition after drainage of the bag. One way of achieving this is to arrange for the manually operable part of the valve to stand proud of the valve body when in the open disposition, and not to stand proud when in the closed disposition.

SUMMARY OF THE INVENTION

It is one aim of the present invention to meet the above described requirements.

According to a first aspect of the present invention there is provided a valve which comprises a valve body and a manually operable, unitary valve member which has a body insert portion rotatable in the valve body between an open disposition for fluid flow through the valve and a closed disposition in which such flow is prevented, the insert portion being housed in a through aperture of the valve body, a leading end of the insert portion being insertable into the aperture from one end thereof and retainable in an operational and sealing disposition by retaining means characterised in that the retaining means comprises a retaining portion of the valve member connected to the insert portion by a bridging portion on which said manual operation is performed, and extending between the insert portion and the retaining portion externally of the valve body, the retaining portion engaging the leading end of the insert portion such as to resist relative rotation of the leading end and the retaining portion, and prevent reverse movement of the insert portion out of the aperture.

With such a valve, the manually operable valve member can be provided as a single moulding of a synthetic polymeric material which is elastically deformable to an extent sufficient to ensure a snap-fit connection between the leading end of the insert portion and the retaining portion.

The bridging portion can be provided with so-called "integral hinges". The polyolefins in general have an integral hinge capability, and it has been found convenient to mould the valve member from polypropylene and the valve body from high density polyethylene, such a combination of two different polyolefins being better for avoiding "stiction" than use of the same polyolefin for both valve components.

According to a second aspect of the present invention there is provided a body fluid storage container which includes a path of fluid drainage from the container and a valve for controlling flow of fluid along the drainage path, the valve comprising a valve body and a valve member which has a body insert portion rotatable in the valve body between an open disposition for fluid flow through the valve and a closed disposition in which such flow is prevented, the insert portion being housed within a through aperture of the valve body, a leading end of the insert portion being insertable into the aperture from one end thereof and retainable in an operational and sealing disposition by retaining means; characterised by actuating means which comprises a touch surface for manual operation of the valve member, from which surface a first limb extends to the leading end of the body insert portion and a second limb extends to the other end of the body insert portion whereby the first and second limbs extend one each side of the drainage path, the touch surface standing less proud of the drainage path when the valve member is in a closed disposition than when it is in the open disposition.

The valve of the second aspect of the invention is preferably in accordance with the first aspect. The valve body will usually have short lengths of inlet and outlet fluid flow conduit extending from it, and it is convenient for the touch surface to lie closely adjacent one or other of these conduits when in the closed disposition, with the first and second limbs extending generally along the fluid flow path, the touch surface being urged by the user away from the conduit for movement of the valve member to the open disposition, with the limbs rotating towards a position in which they project transversely from the fluid flow path with the touch surface at their distal ends standing proud of the flow conduit so as to alert a user of the storage vessel that the valve is open.

For a better understanding of the present invention, reference will now be made, by way of example, to the accompanying drawing.

DESCRIPTION OF THE PREFERRED EMBODIMENT

Figure 1:
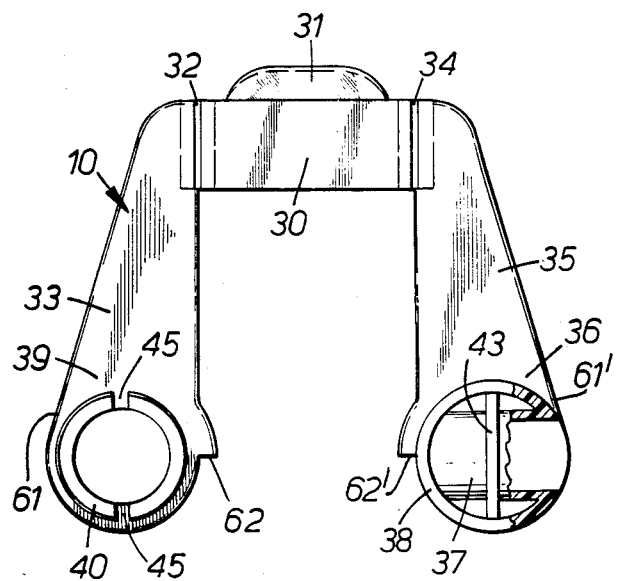
FIGS. 1 and 1A are elevational views of each of the two components of the valve.

The valve shown in the drawings has a valve member 10 formed from polypropylene by moulding and a valve body 11 formed from high density polyethylene, also by moulding.

The valve body 11 has a transverse bore 12 defined by a barrel 13, a fluid inlet path 14 defined by an inlet conduit 15 and an outlet path 16 defined by an outlet conduit 17. The inlet and outlet paths communicate with the bore 12. On the end 18 of the barrel visible in FIG. 1 there is a raised flange 19 which extends around a little more than one quadrant of the circumference of the barrel. The inlet conduit 15 has a tapered portion 20 and end flange 21 for securing it in the bottom seam of a body fluid container which may be, for example, a urine drainage leg bag or a bedside urine drainage bag.

The valve member 10 has a touch surface 30 including a small raised tab 31. Connected to the touch surface by an integral hinge 32 is a first limb 33, and by an integral hinge 34 a second limb 35. At the distal end 36 of the second limb is a body insert portion 37 of the valve member, comprising a cylindrical plug 38 which is an interference fit within the bore 12. At the distal end 39 of the first limb 33 is a retaining formation 40 which makes a snap-fit connection with the plug 38 as explained below. The touch surface 30 and limbs 33 and 35 constitute a bridging portion of the valve member 10, and a valve actuating means.

Figure 1A:
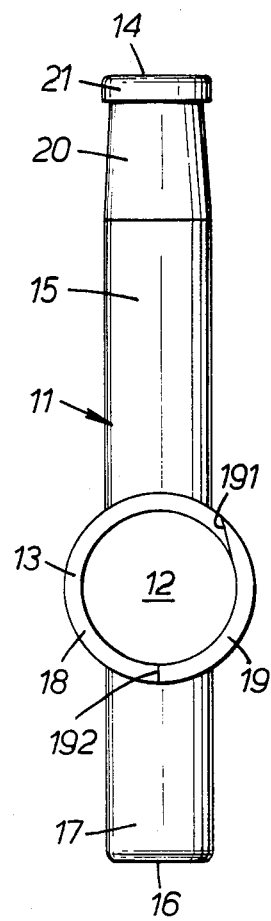
Figure 2:
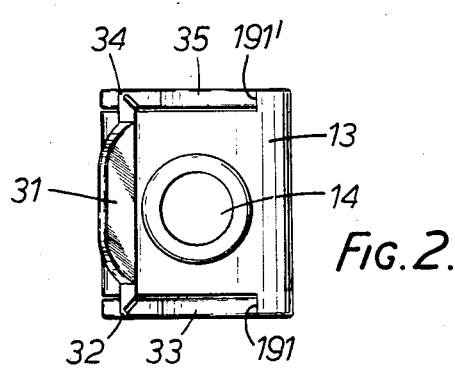
FIG. 2 is a plan view of the valve.
Figure 4:
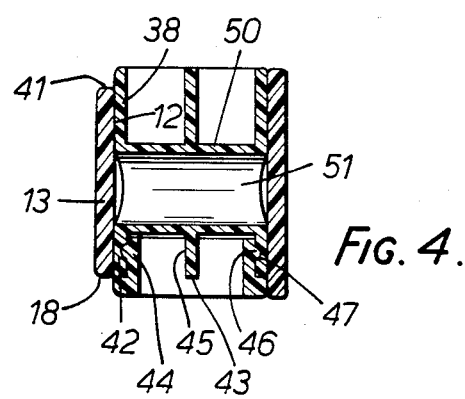
FIG. 4 is a section through IV—IV shown on FIG. 3.

For assembly of the valve, the plug 38 is introduced into the bore 12 at the end 41 opposite to the end 18 visible in FIG. 1A. As best seen in FIG. 4, a leading end 42 of the plug is presented at the end 18 for engagement by the retaining formation 40. The formation 40 is readily presented to the end 18 by folding each of the integral hinges 32 and 34 through a right angle (see FIG. 2). The leading end 42 is hollow but has as a preferred feature a diametral web (otherwise termed a septum) 43 within the end cavity. The retaining formation 40 comprises a cylindrical flange 44 provided with two opposed slots 45 in which the web 43 is a snug fit. This fit eliminates rotation of the retaining formation 40 relative to the plug 38. On the external surface of the flange 44 is a raised annular band 46 which makes a snap-fit with a corresponding annular depression 47 in the plug 38.

Figure 3:
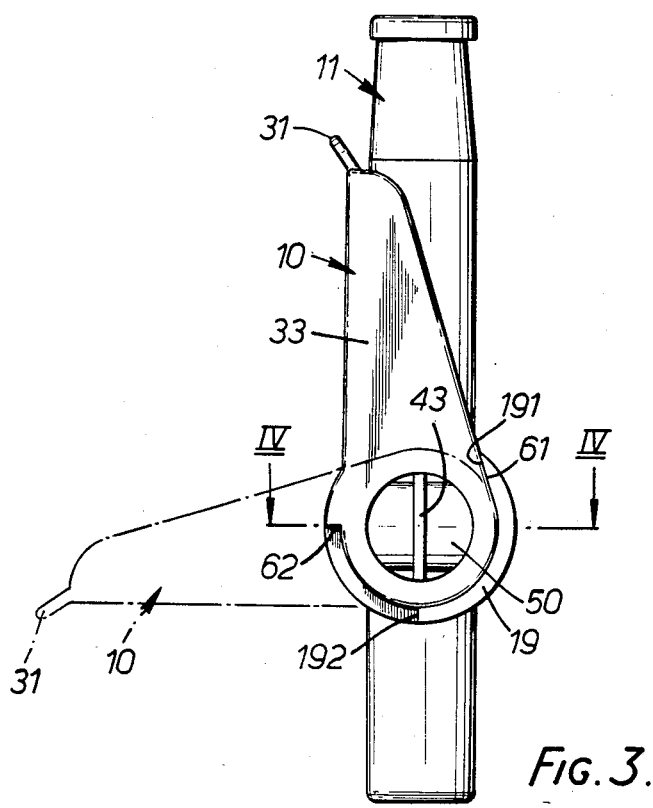
FIG. 3 is an elevation of the assembled valve.

Referring to FIGS. 3 and 4, the plug 38 has a through bore 50 defining a path 51 for fluid, the radii of the bore 50 and the inlet conduit 15 being such that, with the bore 50 in the plug 38 lying transverse to the inlet conduit 15, as shown in FIG. 3, there is no communication between the two fluid paths 14 and 51, and the interference fit between the plug 38 and the barrel 13 ensures that there is no leakage of fluid through the valve. As shown in FIG. 3, therefore, the valve is closed.

For movement to an open disposition the raised tab 31 is levered away from the conduit 15 and the touch surface 30 pushed in order to move the limbs 33 and 35 to the position shown chain dotted in FIG. 3. It will be appreciated that the limbs stand proud of the fluid flow path to such an extent that a wearer of a leg bag will be bound to see that the valve is open, or will be reminded of it by the snagging of the touch surface on his clothing, so that one way or another he is bound to become aware that the valve is open. Conversely, with the touch surface 30 hard against the inlet conduit 15 the valve has no substantial projections.

An abutment surface 61 on the limb 33 abuts a first end surface 191 of the quadrant 19, and equivalent surfaces 61', 191' at the other end of the plug 38 abut to define the closed disposition. The movement of the limbs to the open disposition is halted, by abutment of shoulders 62 and 62' with second quadrant ends 192 and 192', at the open disposition.

In the illustrated embodiment, the surface 191 is at an angle of 19° to the longitudinal axis of the valve body.

In general, edges and corners which are exposed in use of the valve are carefully radiused, and particular care is paid to the surfaces of the barrel 13 which receive the leading end 42 of the plug 38 so as to ensure that neither of the interference fit surfaces mentioned above is scored during assembly.

I claim:

1. A two part valve comprising a valve body and a manually operable, unitary valve member including an insert portion and an integral retaining portion, said insert portion rotatable in the valve body between open and closed positions in which such flow is controlled, said insert portion being housed in a through aperture of the valve body, a leading end of the insert portion being insertable into said aperture from one end thereof and retainable in an operational and sealing disposition therewithin by said retaining means wherein the retaining means comprises a bridging portion on which said manual operation is performed, and extending integrally between the insert portion and the retaining portion externally of the valve body, the retaining portion interconnecting the leading end of the insert portion to resist relative rotation of the leading end and the retaining portion, and preventing withdrawal of the insert portion out of the aperture in the valve body.

2. A valve as claimed in claim 1 wherein the through aperture and the insert portion are cylindrical.

3. A valve as claimed in claim 1 wherein the valve member is a synthetic plastics moulding.

4. A valve as claimed in claim 1 wherein the retaining portion engages the leading end with a snap-fit action.

5. A valve as claimed in claim 1 wherein the bridging portion comprises a central touch surface hingedly connected to first and second limbs, the first limb extending to the retaining portion and hence the leading end of the insert portion, and the second limb extending to the other end of the insert portion.

6. A valve as claimed in claim 1 wherein the valve body includes a length of fluid flow conduit and the bridging portion lies closely adjacent the conduit when in the closed disposition and projects from the conduit when in the open disposition.

7. A valve as claimed in claim 1 wherein the engagement of the leading end of the insert portion and the retaining portion includes engagement between a slot and a web which enters the slot, the web being located on, and extending across, the end face of one of the two said engaging portions.

8. A valve as claimed in claim 1 further comprising first abutment surfaces at both ends of the valve body, and second abutment surfaces on the retaining portion and on the insert portion at the end thereof remote from the retaining portion, the co-operation of the pair of first abutment surfaces with the second abutment surfaces setting limits on the amount of rotation of the insert portion within the valve body.

9. The two part valve defined by claim 1 and a body fluid storage container including a fluid drainage path from said container and wherein flow of fluid from said bag through said fluid drainage path is controlled by said two part valve.

10. A body fluid container as claimed in claim 9 wherein the valve member includes a retaining portion which constitutes said retaining means, the retaining portion being connected to the insert portion by a bridging portion which comprises the touch surface and the first and second limbs.

* * * * *